Oct. 27, 1953
J. P. WILSON ET AL
2,657,045
RUG FEEDING APPARATUS
Filed Aug. 16, 1950
11 Sheets-Sheet 1
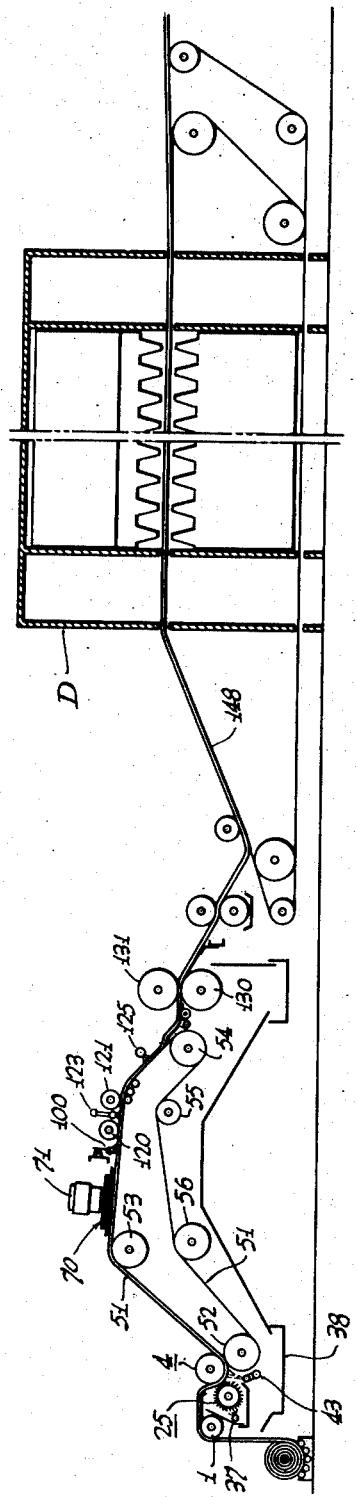
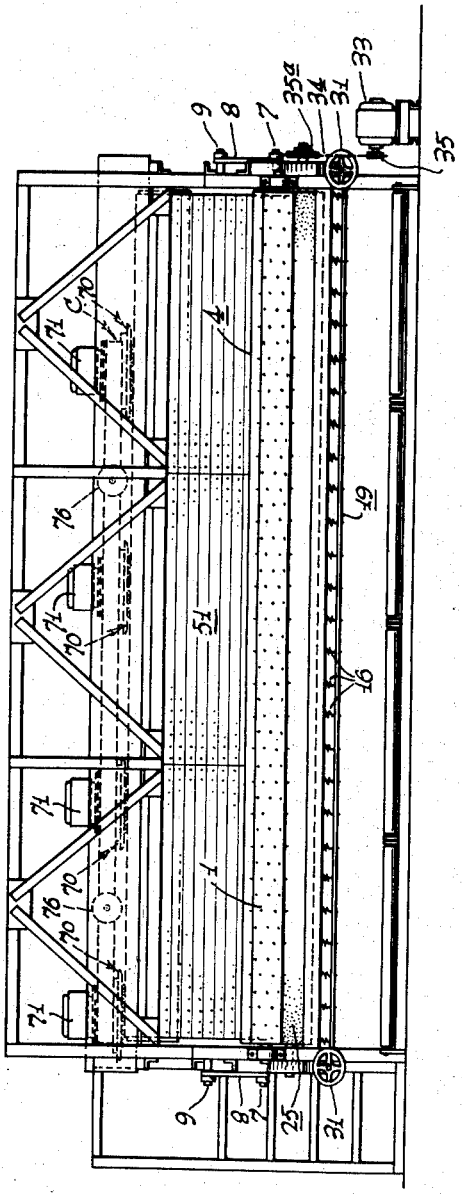
Inventors:
Jack P. Wilson
William H. Scott
by their Attorneys
Howson & Howson

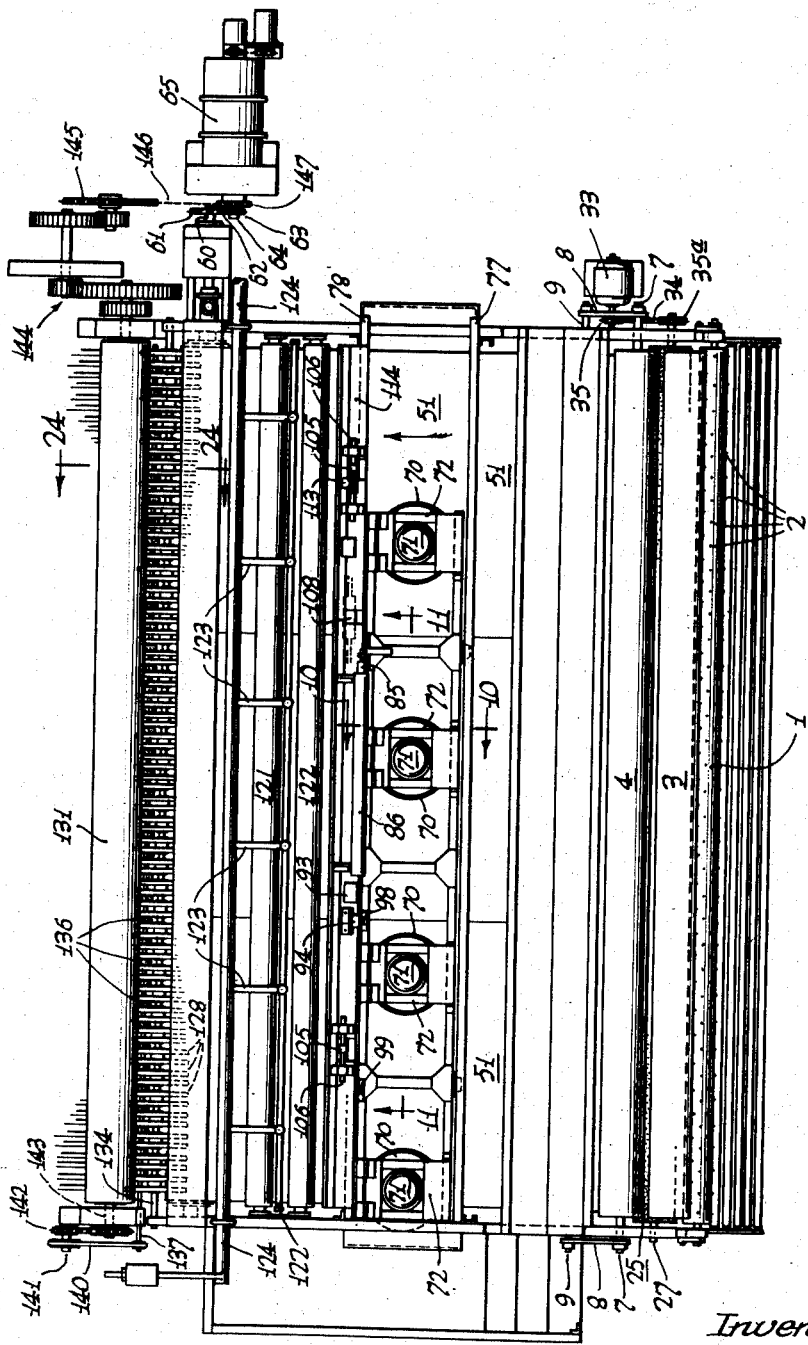

Oct. 27, 1953

J. P. WILSON ET AL 2,657,045

RUG FEEDING APPARATUS

Filed Aug. 16, 1950

Inventors:
Jack P. Wilson
William H. Scott
by their Attorneys
Howson &
Howson

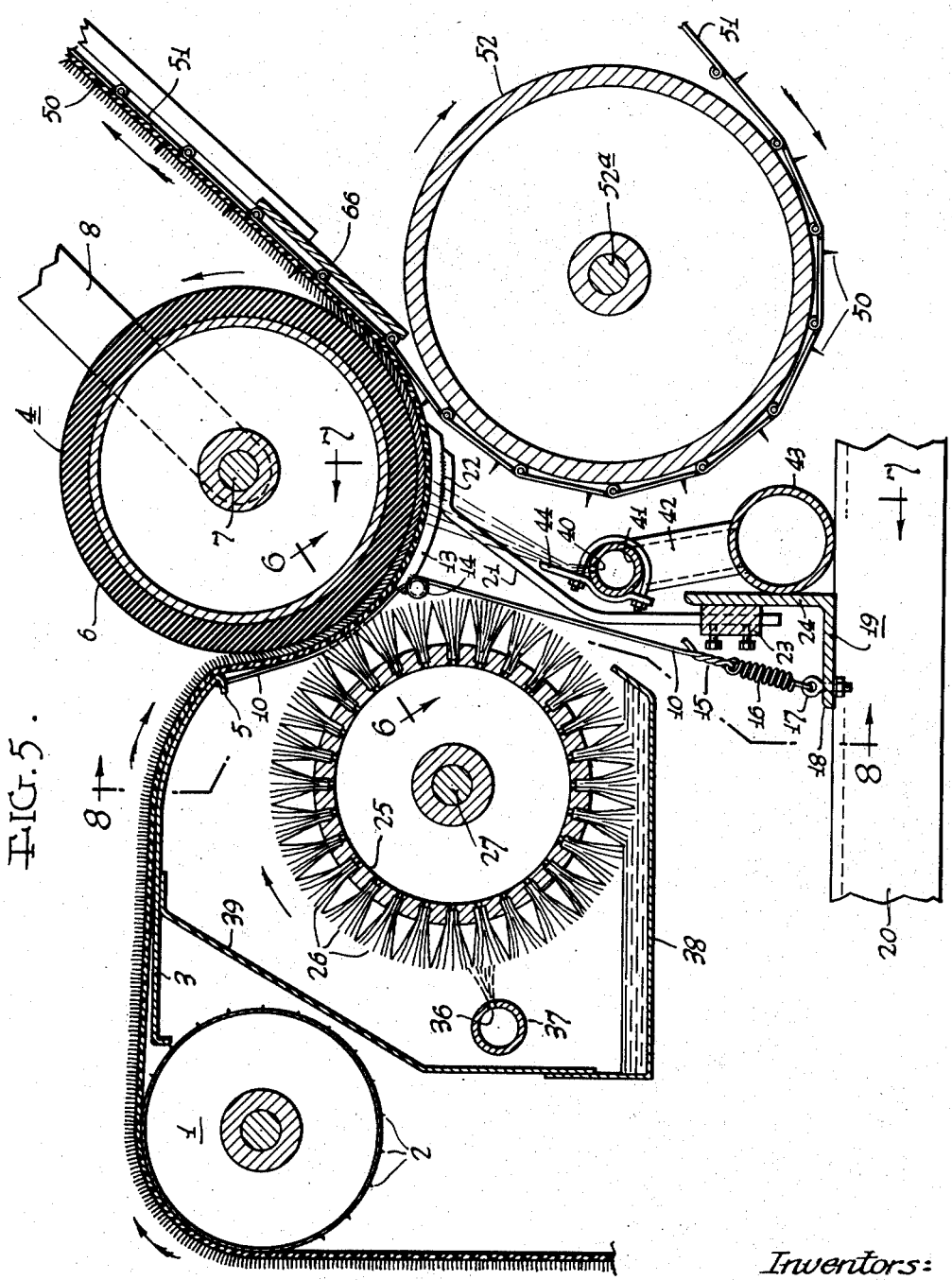

Oct. 27, 1953   J. P. WILSON ET AL   2,657,045
RUG FEEDING APPARATUS
Filed Aug. 16, 1950   11 Sheets-Sheet 5
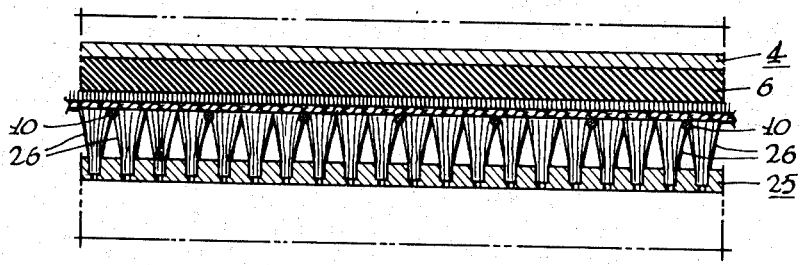
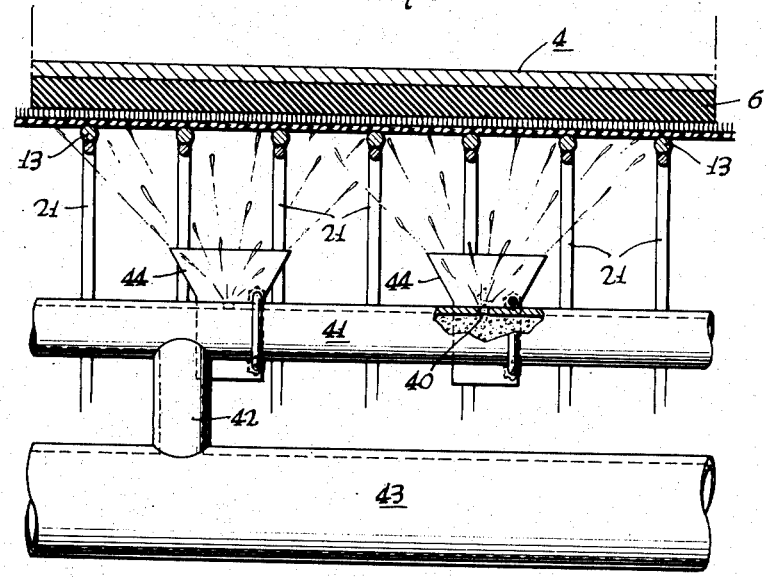
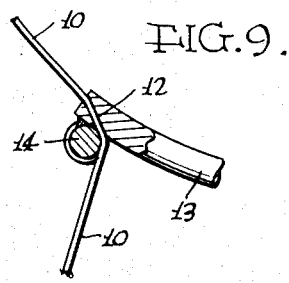
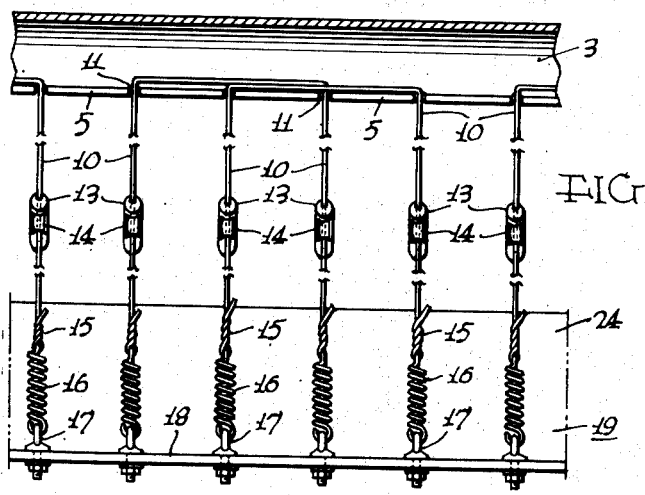
Inventors:
Jack P. Wilson
William H. Scott
by their Attorneys
Howson & Howson Oct. 27, 1953 J. P. WILSON ET AL 2,657,045
RUG FEEDING APPARATUS
Filed Aug. 16, 1950 11 Sheets-Sheet 6
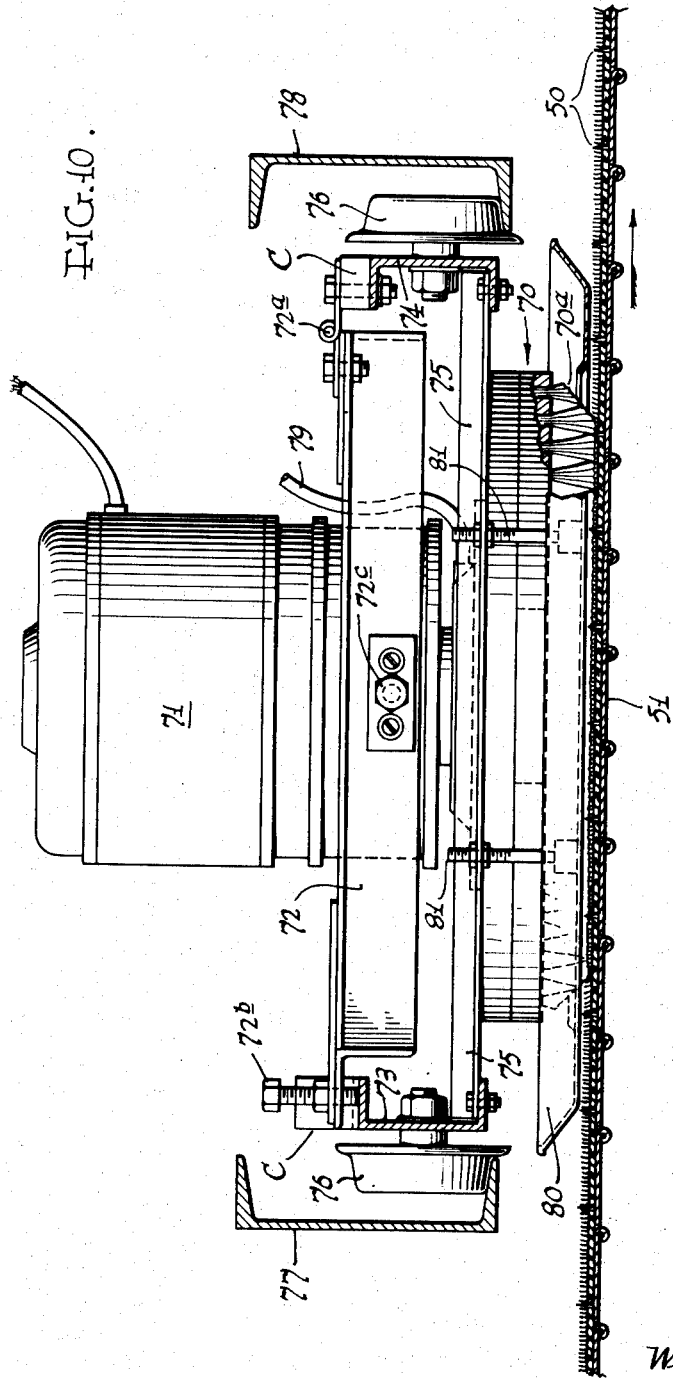
Inventors:
Jack P. Wilson
William H. Scott
by their Attorneys
Howson &
Howson

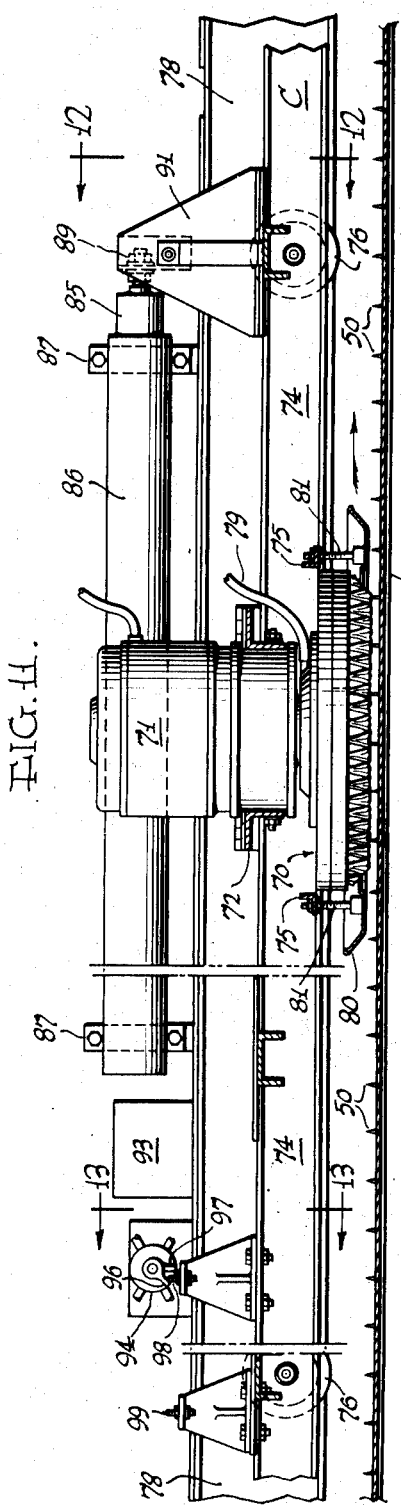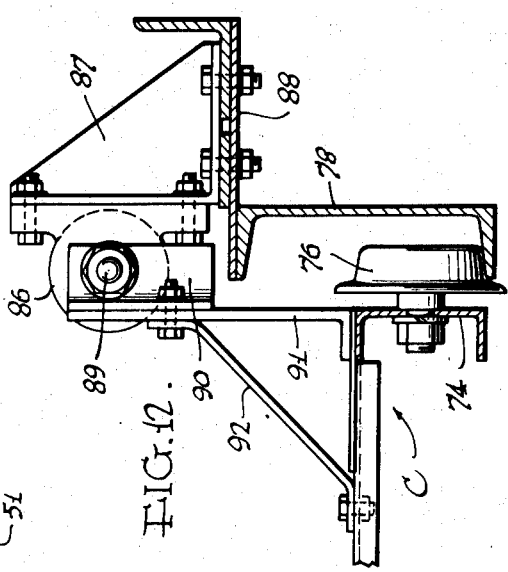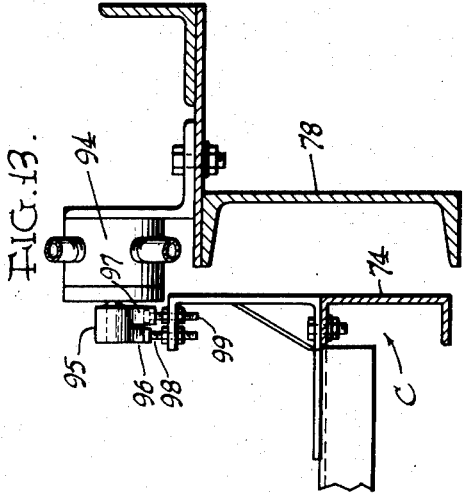

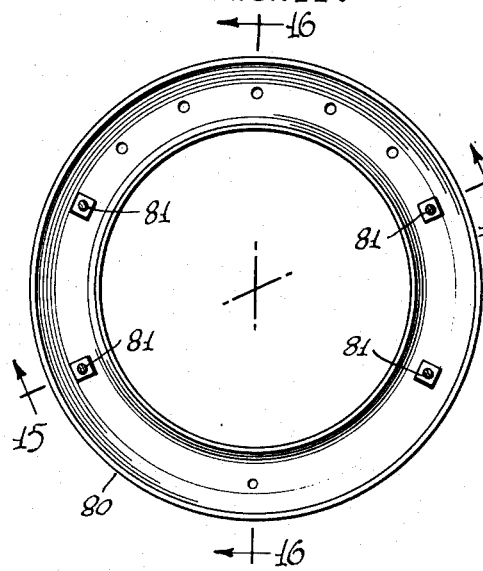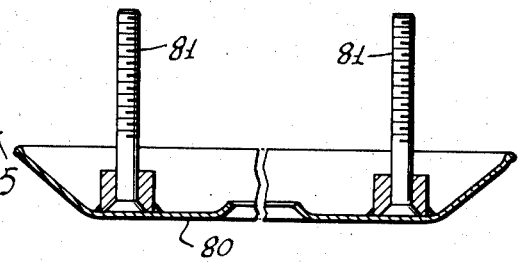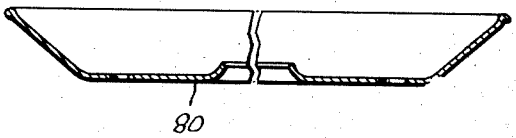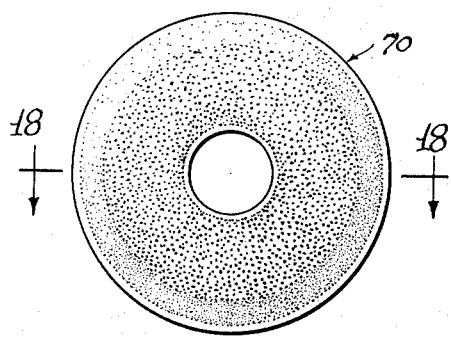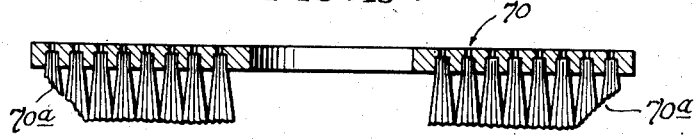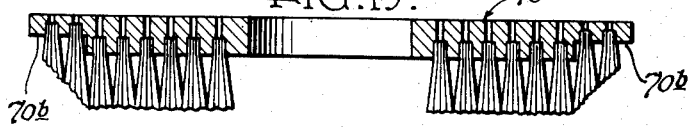

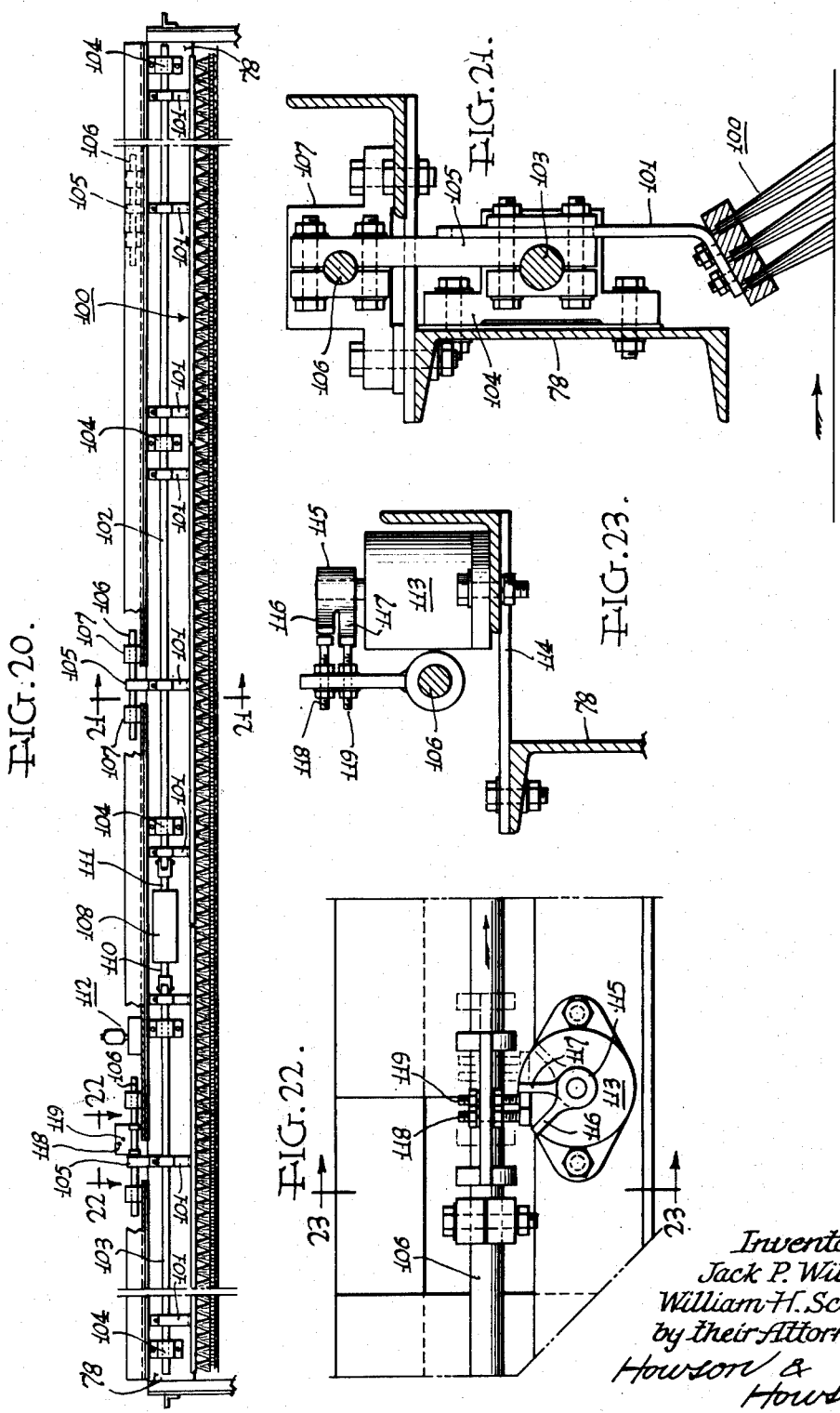

Oct. 27, 1953  J. P. WILSON ET AL  2,657,045
RUG FEEDING APPARATUS
Filed Aug. 16, 1950  11 Sheets-Sheet 10

Inventors:
Jack P. Wilson
William H. Scott
by their Attorneys
Howson & Howson

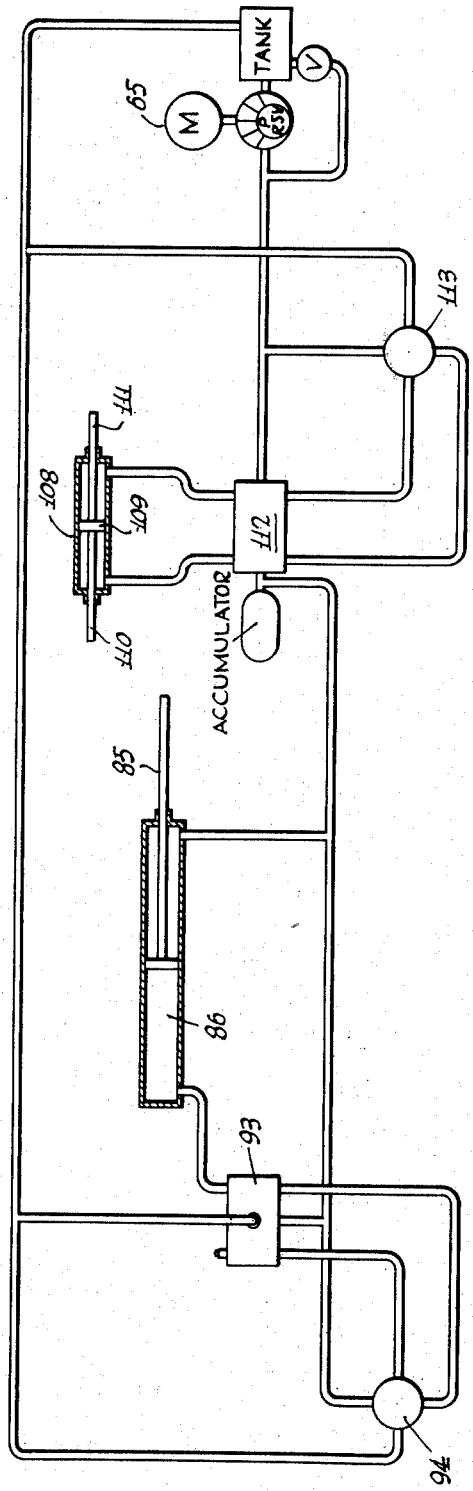

Patented Oct. 27, 1953

2,657,045

UNITED STATES PATENT OFFICE 2,657,045

RUG FEEDING APPARATUS

Jack P. Wilson, Penn Wynne, and William H. Scott, Oreland, Pa., assignors to Proctor & Schwartz, Inc., Philadelphia, Pa., a corporation of Pennsylvania Application August 16, 1950, Serial No. 179,762

5 Claims. (Cl. 271—2.1)

This invention relates to new and useful improvements in scouring and scrubbing machines, and particularly to new and useful improvements in both method and apparatus for scouring and scrubbing rugs and like floor coverings.

Present day practice in substantially all rug cleaning establishments in the United States consists in first scouring and rinsing the pile side of the rug, scouring and rinsing the back of the rug, then squeegeeing or squeeze-rolling the rug and finally drying it. In some very few cases the rugs are stretched during drying in order to maintain or return them to their original size, and an application of sizing to hold them to shape sometimes is made.

Most scouring and rinsing today is done by placing the rug on a cement floor and scouring the pile side thereof with a rotary floor cleaning brush while feeding a mixture of soap and water through the brush to the surface of the rug. After scouring, the surface of the rug is sprayed or rinsed by means of a clear water hose, and the rug is then turned over with the back side facing up and a similar scouring operation is performed on the back. If the establishment is a large one, they may have a large squeeze roll through which the rug is passed to remove excess water and for a thorough flushing to remove all traces of the cleaning soap, a large volume spray of clear water being directed onto the rug surface before it passes through a squeeze roll in order to provide as large a volume of rinse water as possible. If the establishment is small, the excess water and soap are merely scraped from the rug by means of a squeegee or analogous device.

After these operations have been completed, the rug is generally dragged manually into a drying room and mounted to a pole by one edge after which it is hoisted up so that it hangs in the room where it is subjected to circulating hot air or other drying medium.

Some of the major disadvantages of conventional rug cleaning practice, apart from the great amount of time and labor involved, consist in the non-uniformity of scouring and cleaning, the shrinkage of the rug, because in most cases no attempt is made to control or prevent shrinkage, the migration and bleeding of the colors in the rug due to hanging them in a vertical position in the drying room, and the limpness and loss of shape due to loss of sizing during the scouring.

With the foregoing in mind, the principal object of the present invention is to provide a novel method and apparatus for scouring and cleaning rugs which effectively eliminates all of the foregoing disadvantages and objections encountered in present day practice and which in particular provides a uniform cleaning of the rug by mechanical means that substantially reduces the amount of time and labor required while maintaining positive control of the rug to prevent shrinkage thereof.

Another object of the invention is to provide a rug scouring machine as set forth which utilizes a single conveyor and at the same time provides for the scrubbing of both sides of the rug by mechanical means.

Another object of the invention is to provide a method and apparatus for scouring rugs having the features and advantages set forth, which is highly efficient and effective in operation and use.

These and other objects of the invention and the various features and details of the construction and operation thereof are hereinafter set forth and described with reference to the accompanying drawings, in which:

Fig. 1 is a schematic side elevational view of a rug cleaning range embodying rug scouring apparatus made according to the present invention, and a dryer for the rugs.

Fig. 2 is a top plan view of the rug scouring apparatus of the present invention;

Fig. 3 is a front end elevational view of the scouring apparatus;

Fig. 5 is an enlarged fragmentary vertical sectional view longitudinally of the machine showing the feed-in and back scrubbing arrangement of the machine as well as the mechanism for mounting the rugs upon the conveyor;

Fig. 6 is a fragmentary sectional view on line 6—6, Fig. 5;

Fig. 7 is a fragmentary sectional view on line 7—7, Fig. 5;

Fig. 8 is a fragmentary sectional view on line 8—8, Fig. 5;

Fig. 9 is an enlarged fragmentary sectional view on line 9—9, Fig. 8.

Fig. 10 is an enlarged sectional view on line 10—10, Fig. 2;

Fig. 11 is an enlarged sectional view on line 11—11, Fig. 2;

Fig. 12 is an enlarged sectional view on line 12—12, Fig. 11;

Fig. 13 is an enlarged sectional view on line 13—13, Fig. 11;

Fig. 14 is a detached plan view of a floating hold-down plate embodied in each of the rotary scrubbing devices shown in Fig. 10;

Fig. 15 is an enlarged sectional view on line 15—15, Fig. 14;

Fig. 16 is an enlarged sectional view on line 16—16, Fig. 14;

Fig. 17 is an inverted view from the bottom of one of the brush elements embodied in the rotary scrubbing device of Fig. 10;

Fig. 18 is an enlarged sectional view on line 18—18, Fig. 17;

Fig. 19 is a sectional view similar to Fig. 18 showing a modified construction of the brush;

Fig. 20 is a sectional view on line 20—20, Fig. 4;

Fig. 21 is an enlarged sectional view on line 21—21, Fig. 20;

Fig. 22 is an enlarged fragmentary view in plan taken on line 22—22, Fig. 20;

Fig. 23 is a sectional view on line 23—23, Fig. 22;

Fig. 26 is a schematic diagram showing the fluid system and operating pistons which effect reciprocation of the rotary scrubbing brush devices and the transversely oscillating brush, respectively.

Figure 4:
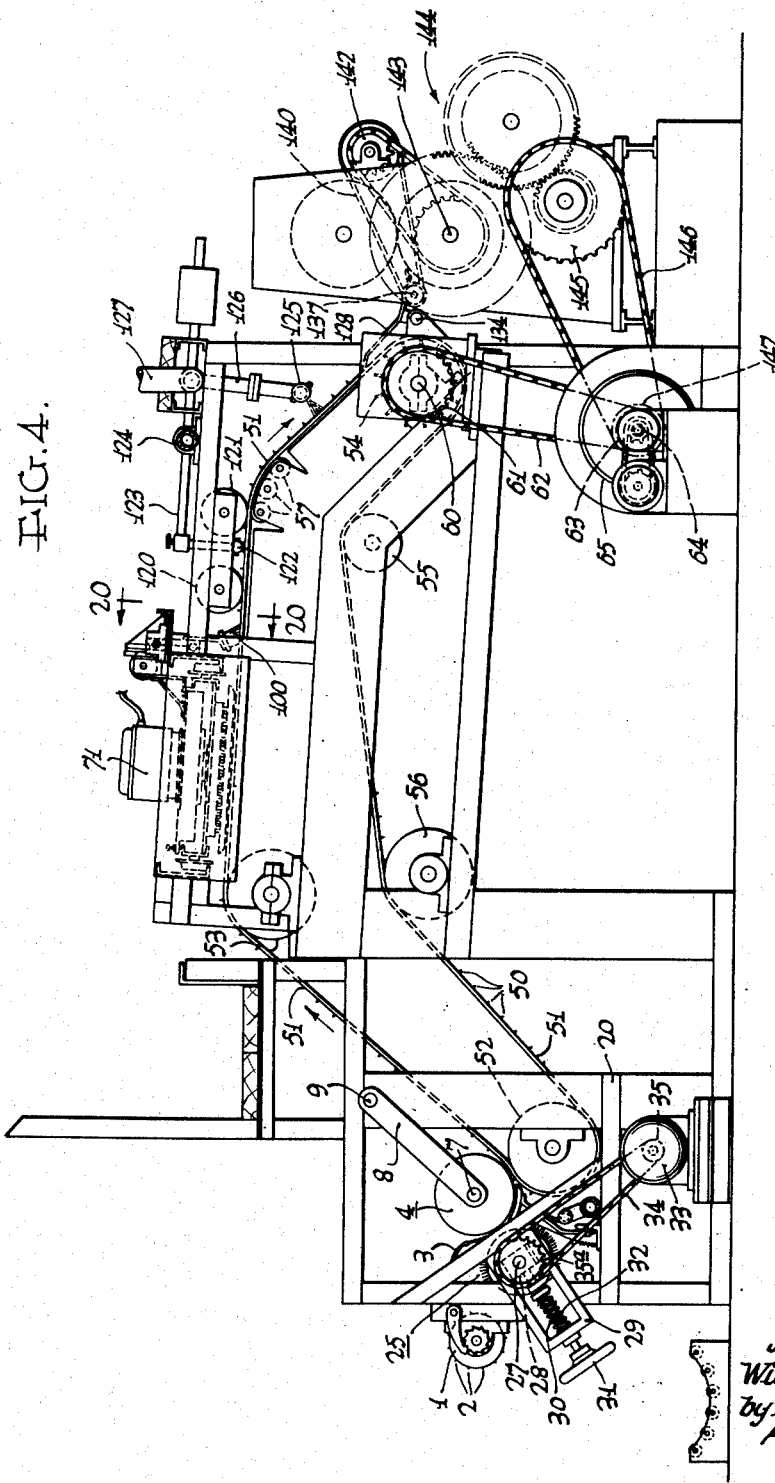
Fig. 4 is an enlarged side elevational view of the rug scouring apparatus.

Referring now to the drawings, and more particularly to Figs. 4 and 5, thereof, a rug or like article to be scoured is fed into the apparatus of the present invention over a feed roll 1 which is provided with a plurality of projecting pins 2 thereon to assist the operator in manually holding a rug on the feed roll 1 until the rug has been fed a sufficient distance into the apparatus. In accordance with the present invention the rug is fed to the apparatus so that the back or base of the rug is in contact with the feed roll 1 with the pile side thereof exposed or facing outwardly as shown in Fig. 5.

After leaving the feed roll 1 the rug passes over a bed plate 3 which extends the entire width of the machine and substantially spans the space between the feed roll 1 and an adjacent push-on roll 4. As shown in Fig. 5 of the drawings, the inner portion of the bed plate 3 curves downwardly and the edge thereof is bent under to provide a flange 5, the purpose for which will later appear.

The push-on roll 4 is provided with a relatively soft rubber cover 6 and is mounted on a shaft 7 which has its opposite ends journaled in the lower ends of angularly disposed arms 8. The upper ends of the arms 8 are secured to opposite sides of the structural framework of the apparatus as indicated at 9 in Fig. 4.

As the rug leaves the bed plate 3 at the inner end thereof the rug passes about the push-on roll 4 with the pile side thereof in contact with the rubber cover 6 of said roll and the back side or base of the rug facing outwardly, for example, in the relation shown in Fig. 5 of the drawings. In a portion of the course of its passage about the lower surface of the roll 4 the rug is supported in contact therewith by means of a series of wires 10 arranged, for example, as shown in Figs. 8 and 9 of the drawings.

With reference to Fig. 8, the wires 10, which may be of relatively heavy construction, for example, piano wire, each pass upwardly through a slot or notch 11 in the bed plate flange 5 and then pass downwardly through another notch 11. The vertical courses of each such wire 10 then pass through a hole 12 in one of a plurality of supporting shoes 13, and then about a bushing 14 and downwardly where their opposite ends are connected, as indicated at 15, to the upper ends of coiled tension springs 16. The springs 16 have their opposite ends secured in eyebolts 17 which are fixedly anchored in the horizontal flange 18 of an angle plate 19 that is mounted on the bottom side frame members 20 of the apparatus. The several wires 10 are arranged in lapped pairs at spaced intervals entirely across the machine.

The shoes 13 previously mentioned serve also to support the rug during a portion of its passage about the push-on roll 4. These shoes 13 are arranged at equally spaced intervals entirely across the apparatus, for example, as shown in Fig. 7 of the drawings, the said shoes 13 being supported by upstanding legs 21 having their upper ends welded to the shoes 13 as indicated at 22, and their lower ends adjustably mounted in brackets 23 secured to the upstanding web 24 of the aforesaid angle bar 19, for example, in the relation shown in Fig. 5 of the drawings. Adjustment of the shoes 13 relative to the push-on roll 4 is desirable both for controlling the pressure exerted by the shoes 13 on the rug, and also to provide for rugs of different thickness which may be passed through the apparatus.

In the course of passage of the rug about the push-on roll 4 the back side or base of the rug is thoroughly scrubbed and scoured by means of a cylindrical brush 25 having groups of bristles 26 arranged longitudinally and circumferentially thereof. The brush 25 extends entirely across the machine and is mounted on a shaft 27 which has its opposite ends journaled in blocks 28 (see Fig. 4). The blocks 28 are slidably mounted in guide frames 29 secured at opposite sides of the machine and the position of the blocks 28 in the guides 29 is adjustable by means of jack screws 30 operated by handwheels 31. By this construction the position of the brush 25 with respect to the roll 4 and consequently the back side of a rug, may be varied as desired. In addition to the adjustability provided by the jack screws 30, the brush 25 is yieldingly mounted by means of relatively heavy springs 32 which are coiled about the jack screws 30 and act between the end cross-head portion of the guide 29 and the blocks 28.

The brush 25 is rotationally driven at a predetermined speed by means of a motor 33 through a chain 34 which passes about a relatively small sprocket 35 on the motor shaft and a relatively larger sprocket 35a fixed on the shaft 27 of the brush. The brush 25 is driven in the clockwise direction as shown by the arrow in Fig. 5 and as the brush rotates there is discharged onto the bristles, prior to contact thereof with the back side of the rug, a supply of a mixture of water and a cleaning agent such as soap. This mixture is discharged outwardly through an aligned series of openings 36 provided in a distributing pipe 37 which receives the cleansing mixture from a suitable source of supply (not shown). A drip pan 38 for excess cleaning material underlies the brush 25 and the spray device 37, in the relation shown in Fig. 5. The tray 38 is secured to the lower edge of a suitable splash guard 39, the splash guard 39 and drip tray 38 extending entirely across the full width of the machine.

The brush 25 operates to thoroughly clean and scrub the back side or base of the rug as the latter passes around the push-on roll 4 and, after the rug is scrubbed and cleaned by the brush 25, continued movement of the rug brings the back side thereof into the path of a number of suitable rinsing sprays which are discharged through openings 40 in a distributing pipe 41 which extends entirely across the machine. The distributing pipe 41 in turn is supplied with rinse water or other liquid through several pipe connections 42 thereto from a main supply manifold 43. Mounted upon the distributing pipe 41 of the rinse spray equipment are deflectors 44 arranged, respectively, in association with each discharge opening 40 in the pipe 41. The deflectors 44 are constructed and mounted as shown in Figs. 5 and 7 of the drawings and operate to spread or fan-out the rinse liquid so that coverage of the entire transverse width of the rug is assured.

In addition to supporting the rug during scrubbing and rinsing of the back side thereof, the push-on roll 4 operates to impale the rug upon sharp pins or spikes 50 which are secured to and project outwardly from an endless conveyor 51. As shown in the drawings, and particularly Fig. 5 thereof, the conveyor 51 preferably is of the hinged plate type and the pins 50 are secured therein, for example, on 3" centers both in the direction of travel of the conveyor and transversely thereof. The conveyor 51 extends about a plurality of wheels 52, 53, 54, 55 and 56, respectively, arranged as shown in Fig. 4 of the drawings so that the endless conveyor 51, commencing adjacent the push-on roll 4, follows an angularly upward course to the wheel 53 then moves substantially horizontally to a plurality of guide rollers 57 from which it declines angularly and then passes about the wheel 54 from which it follows a return course over the wheels 55 and 56 back to the wheel 52. The wheel 54 has a shaft 60 and this, together with said wheel 54, is rotationally driven at a predetermined rate of speed by a sprocket 61 which is secured on the shaft 60 and is driven by means of a chain 62 from a sprocket 63 on the shaft 64 of a motor 65 (see particularly Figs. 2 and 4 of the drawings).

With reference more particularly to Fig. 5 of the drawings, it will be observed that the conveyor wheel 52 is mounted subjacent the push-on roll 4 so that the conveyor 51 as it leaves the wheel 52 passes closely adjacent the peripheral surface of the push-on roll 4 so that the latter operates to impale the rug on the pins or spikes 50 of the conveyor, the arrangement being such that the back side or base of the rug is in contact with the endless conveyor 51 with the pile side thereof facing upwardly or outwardly as shown. As it leaves the wheel 52 the conveyor 51 passes over a backing plate 66 which serves to support the conveyor during impalement of the rug thereon.

In the past, one of the difficulties encountered in most attempts to provide a continuous rug scouring machine of the type here involved has been the tendency for the rug to buckle between adjacent points of impalement on the conveyor pins. Unless the rug rests flat on the conveyor a uniform cleaning of the rug cannot be obtained and, furthermore, the buckles or ripples in the rug between adjacent pins longitudinally of the conveyor provide an excess of rug material between the pins which is available for shrinkage. However, in the present invention buckling of the rug between adjacent pins longitudinally of the conveyor is entirely eliminated by mounting the wheel 52 and its shaft 52a so that the conveyor 51, as it leaves the wheel 52, does not travel on a line truly tangent to the surface of the wheel 52 but rather is caused to be offset or deflected by the roll 4 slightly in the direction of the wheel 52 thereby causing the successive plates of the conveyor 51 to be disposed outwardly convergent at a small angle relative to each other as will be discernible by reference to Fig. 5 of the drawings.

By causing the successive plates of the conveyor 51 to be angularly deflected relative to each other as they leave the wheel 52 and pass on to the backing plate 66, the distance between the points of the pins passing opposite the push-on roll 4 is reduced an amount sufficient to compensate for the excess amount of the rug in a given plane dimension due to the curvature of the rug about the push-on roll. Consequently, when the rug and conveyor 51 flatten out after leaving the push-on roll 4 the length of rug between each set of pins 50 longitudinally of the conveyor will be substantially the same as the spacing of the pins with the result that not only is buckling of the rug prevented between adjacent pins 50 but the latter serve effectively to secure the rug against material shrinkage.

The conveyor 51 with the rug impaled thereon as described carries the rug upwardly and over the wheel 53 whence the conveyor and rug thereon travel in a generally horizontal direction to the idler rolls 57. During travel of the rug through this horizontal portion of the conveyor course, it will be apparent that the pile side of the rug is facing upwardly and exposed for cleaning, and is thoroughly scrubbed and scoured by means of a plurality of rotary brushes 70 each driven by a suitable source of power such as an electric motor 71. In the illustrated embodiment of the invention four such brushes 70 are provided and these are carried in suitable frames 72 which form part of a generally rectangular frame or carriage C comprising side rails 73 and 74 and connecting members 75 constructed and arranged so that the frames 72 span the space between the rails 73 and 74 and the brushes 70 are disposed intermediate the latter, for example, as shown in Figs. 4 and 10 of the drawings.

The brush carriage C is adapted to be moved back and forth transversely of the machine and crosswise of the pile side of the rug so that the rotating brushes 70 are caused to contact or engage the entire width of the rug. For this purpose the side members 73 and 74 of the carriage mount wheels or the like 76 which are adapted to ride upon the lower flanges of a pair of inwardly facing channel frame members 77 and 78, respectively, which are fixedly secured transversely of the machine, for example, as shown in Figs. 2, 4 and 10.

A mixture of water and cleaning agent such as soap is supplied to each of the rotary brushes 70 through a flexible hose or the like 79. The forward motion of the rug on the conveyor 51 and the crosswise movement of the rotary brushes 70 produce a definite path of scouring upon the rug which is controllable and is automatically maintained by driving the rotating brush carriage back and forth in timed relation to the travel of the rug through the machine.

The rotary brushes 70 may be floatingly mounted on the frames 72 so that they automatically adjust themselves to the various thicknesses of the rug that may be conveyed through the machine. In this connection it is to be noted that each brush frame 72 is pivoted to the carriage C at one side thereof, and at its opposite side the frames 72 simply rest upon the carriage, being supported by an adjustable pin 72b. In addition, the motor 71 and brush 70 are pivotally mounted in the frames 72 as indicated at 72c arranged at diametrically opposite sides of the motor and providing a pivot axis for the motor 71 and brush 72 disposed in parallel spaced relation with respect to the pivot axis of the frame 72 about its pivot 72a. By this construction it will be apparent that the brush 72 will engage uniformly upon the surface of a rug regardless of the thickness of the rug and without the necessity of adjusting the frame 72 by its pin 72b for different thicknesses of rugs as they pass through the machine.

The construction of the rotary brushes 70 is shown in Figs. 17 and 18 of the drawings. In this connection it is to be noted that the two outer circumferential courses of the brush bristles are beveled outwardly and upwardly as indicated at 70a thus minimizing any tendency for the transverse movement of the brushes 70 to fold or flip over portions of the rug, particularly at the opposite side edges thereof, and this may be further minimized by making the two outer circumferential courses of the brush bristles relatively softer than the inner courses of the bristles. Since the two outer courses of the brush bristles 70a are stiffened by the fact that they are cut off to provide the bevel, it may be desirable while retaining the peripheral bevel of the outer courses of the bristles, nevertheless, to provide a reasonable length of bristle in these two outer courses, and this may be accomplished, for example, by upwardly offsetting the mounting of the two outer courses of bristles shown as 70b in the modified form of brush shown in Fig. 19 of the drawings.

Surrounding each of the rotary brushes 70 is an annular presser plate element 80 which is constructed and configurated as shown more particularly in Figs. 14 to 16 of the drawings and is rigidly suspended from the cross-connecting piece 75, for example, by means of upstanding bolts 81. These annular presser members are adapted to maintain the rug impaled upon the pins 50 of the conveyor 51 and prevent accidental displacement therefrom as the result of the action of the rotating brushes 70.

With reference more particularly to Figs. 11, 12 and 13 of the drawings, the rotary brush carriage C is actuated back and forth across the rug in the manner described by means of an hydraulically operated piston 85 which operates within a cylinder 86 (see also Fig. 2). The cylinder 86 is mounted in horizontal position above the side member 78 by means of brackets 87 which are secured, for example, by bolts to a mounting plate 88 which projects laterally from the top of said member 78 as shown in Fig. 12. The outer end of the piston 85 is connected, as indicated at 89, to a plate 90 which is fixedly mounted to an upstanding generally triangular bracket plate 91 which is carried by the carriage C in overlying relation to the side rail 74, being braced by an angle brace 92.

Flow of liquid to the hydraulic cylinder 86 is controlled by a 4-way valve 93 from a pilot valve 94. The pilot valve 94 is operated by a rockable member 95 having a pair of projecting arms 96 and 97, respectively, arranged, for example, as shown in Figs. 11 and 13 of the drawings. Actuation of the pilot valve rocker 95 is accomplished by means of upwardly projecting fingers 98 and 99 carried by the brush carriage C and arranged respectively in the path of the arms 96 and 97.

In the position of the rotary brush carriage C shown in Figs. 2 and 11, the carriage is at the extreme left hand limit of its movement and the finger 98 has engaged the arm 96 and actuated it in the clockwise direction with respect to Fig. 11 thereby causing oil or other hydraulic fluid to enter the cylinder 86 in a direction to effect actuation of the piston 85 in the right hand direction with respect to Fig. 11 thereby correspondingly actuating the carriage C and the several rotating brushes 70, a typical hydraulic system suitable for this purpose being shown in Fig. 26 of the drawings.

Conversely, as the carriage C and its rotating brushes reach the end of their travel in the right hand direction with respect to Figs. 2 and 11, the finger 99 will engage and actuate the valve arm 97 thereby operating the pilot valve 94 to cause hydraulic fluid to flow in the opposite direction and effect actuation of the piston 85 to the left with respect to Fig. 11 resulting in corresponding traverse of the carriage C and the rotating brushes 70 carried thereby.

After the rug has been subjected to the described scrubbing and scouring action by the rotary brushes 70, continued movement of the conveyor 51 brings the rug into engagement with a transversely oscillating pile laying brush 100 shown, for example, in Figs. 4, 20 and 21 of the drawings. This brush 100 operates to break up any pattern produced in the pile surface of the rug by the combined rotary and reciprocatory action of the brushes 70 and to lay the pile of the rug relatively uniformly. As shown in Fig. 20 of the drawing, the transversely oscillating brush 100 is made up of a plurality of elongated aligned sections each fixedly mounted in suspended relation from rods or shafts 102 and 103 by means of vertically extending rigid brackets 101. The rods 102 and 103 are arranged in alignment with each other and are slidably mounted in suitable brackets 104 at the rearward side of the rail 78.

Additional support is provided for each section of the brush 100 and the rods 102 and 103 by extending the middle bracket of each brush section upwardly as indicated at 105, in Fig. 21, and rigidly connecting the upper end thereof to a relatively short shaft member 106 which has its opposite end portions mounted for axially sliding movement in relatively spaced sleeve or guide bearings 107.

Reciprocatory oscillation of rods 102 and 103, and hence the brush 100, is accomplished by means of a double acting hydraulic cylinder 108 which actuates an internal piston 109 (see Fig. 26) having oppositely extending piston rods 110 and 111 disposed between and connected respectively to the adjacent ends of the rods 103 and 102, for example, as shown in Fig. 20. With reference to Fig. 26, operation of the piston 109 is controlled by a 4-way valve 112 under the master control of a pilot valve 113. As shown in Figs. 20 and 23 the pilot valve 113 is mounted on a bracket 114 secured to the top of the side rail 78. As in the case of the pilot valve 94, the pilot valve 113 is operated by a rocker member 115 having projecting arms 116 and 117 angularly arranged with respect to each other. The pilot valve arms 116 and 117 are actuated respectively by fingers 118 and 119 carried by a bracket on the left hand one of the short rods 106 and the construction and arrangement of the said fingers 118 and 119 as well as the arms 116 and 117 of the pilot valve is such that the transversely reciprocable brush 100 is caused to oscillate back and forth at a relatively high frequency through a stroke of substantially short length, the operation of the pilot valve 113 through actuation of the fingers 118 and 119 being generally similar to actuation of the pilot valve 94, previously described.

It is to be noted that the brush 100 is constructed and arranged so that the bristles thereof are disposed at an acute angle to the surface of the rug and decline toward the rug surface in the direction of travel of the rug, see for example, Fig. 21 of the drawings. This construction and arrangement of the pile laying brush 100 is provided for the purpose of affording a better feed of the rug beneath the brush and also to permit the use of relatively long bristles, particularly at the rear of the brush.

After the rug has been subjected to the pile laying action of the transversely reciprocating brush 100 continued movement of the conveyor 51 brings the rug into engagement with a rinsing device which extends across the rug the entire width of the machine. As shown in Figs. 2 and 4 of the drawings, this rinsing device comprises a pair of relatively spaced rolls 120 and 121 which are adapted to engage upon the surface of the rug and clear rinse water is discharged from a narrow continuous slot in a transversely extending pipe 122 against the upwardly facing pile side of the rug intermediate said rolls 120 and 121, rinse water being supplied to the pipe 122 through branch pipe 123 from a distributing pipe 124. The rolls 120 and 121 operate to entrap therebetween a mass of the water which flows out between the ends of the rolls at the sides of the machine and effects a thorough rinsing of the soap or other cleaning agent from the rug. After passing beneath the rinse device the rug and conveyor 51 pass over the small rolls 57 and then take a downwardly inclined course to bring the pile side of the rug into engagement with a secondary rinse in the form of a spray or jet of clear water discharged onto the pile surface of the rug through a narrow elongated slot in a transversely extending pipe 125, the latter being supplied with water through a branch pipe 126 from a supply 127.

Figure 24:
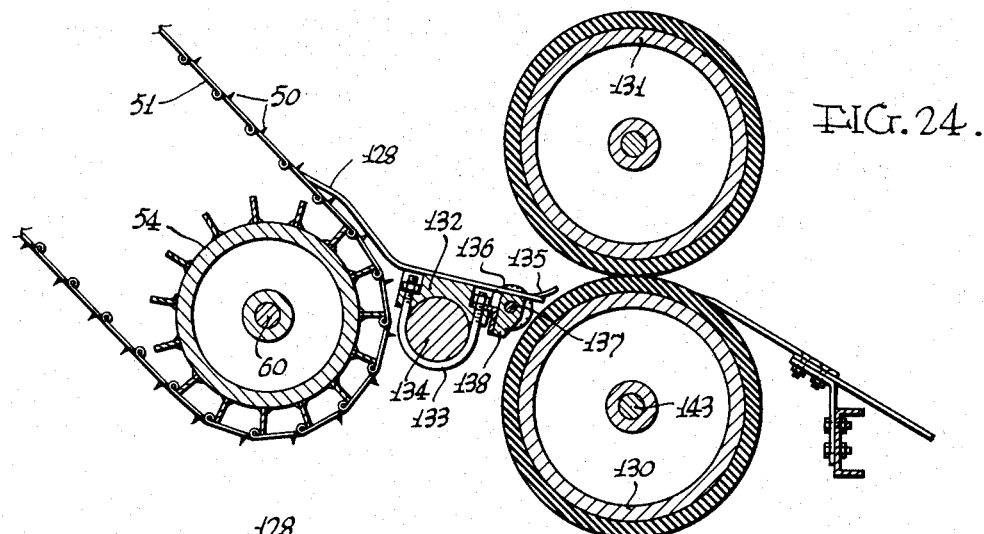
Fig. 24 is an enlarged fragmentary sectional view on line 24—24, Fig. 2.
Figure 25:
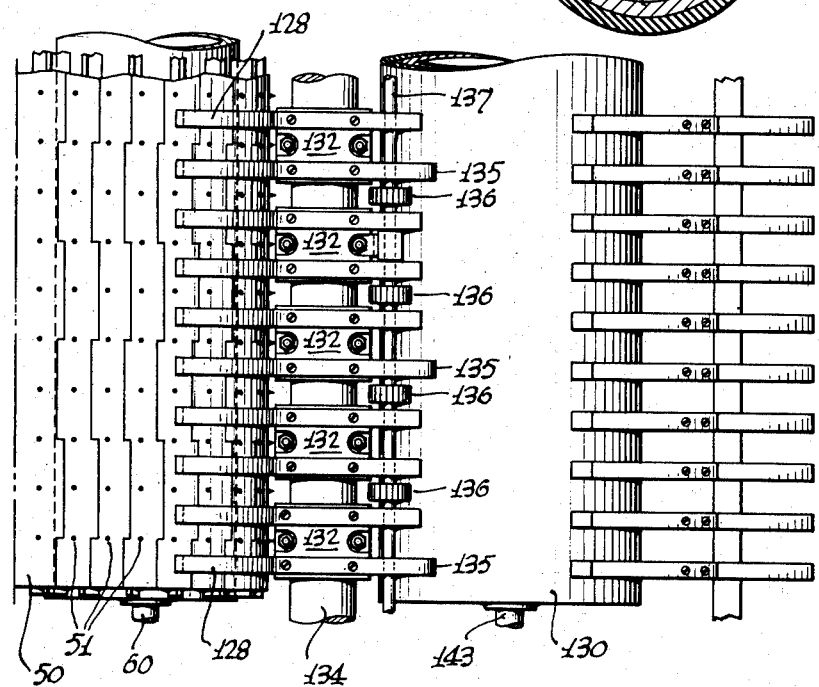
Fig. 25 is a fragmentary plan view of the disclosure in Fig. 24.

Following the secondary rinse the rug and conveyor 51 continue to move downwardly toward the driven wheel 54. As the rug approaches the wheel 54 on the conveyor 51 the rug is disengaged from the pins 50 of the conveyor 51 by means of a plurality of fingers 128 (see Figs. 24 and 25) which direct the rug away from the conveyor 51 toward a pair of relatively superimposed squeeze rolls 130 and 131. The fingers 128 are uniformly spaced across the entire width of the machine and are mounted in pairs in suitable brackets 132 which are secured by means of U-bolts 133 upon a transverse rod 134 that extends entirely across the machine intermediate the wheel 54 and the lower squeeze roll 130. Certain of the fingers 128 have their outer ends adjacent the squeeze rolls 130 and 131 extended and upwardly curved as indicated at 135 to direct the leading edge of the rug to and between said rolls 130 and 131.

In addition, and in order to insure proper feeding of the rug to the rolls 130 and 131, there is provided between each pair of fingers 128 a toothed feed roll 136 which is fixedly mounted upon a shaft 137 rotatably mounted in auxiliary support brackets 138 which are secured to each of the brackets 132 previously described. This shaft 137 is rotationally driven by a belt 140 (Fig. 2) from an idler shaft 141 which in turn is driven by a chain and sprocket arrangement 142 from the shaft 143 of the lower squeeze roll 130, the latter being driven at its opposite end by suitable gearing 144 from a sprocket 145 which is driven by a chain 146 from a sprocket 147 on the shaft 64 of the motor 65. After the rug passes between the squeeze rolls 130 and 131 it may be deposited onto a conveyor 148 (Fig. 1) and thereby conducted through a suitable dryer generally designated by reference character D.

From the foregoing description it will be observed that the present invention provides a novel apparatus for scouring and cleaning rugs which eliminates effectively the numerous disadvantages and objections encountered in present day rug cleaning practices. The invention particularly provides a novel method and apparatus for effecting a uniform cleaning of rugs by mechanical means which substantially reduces the time and labor required and at the same time maintains positive control of the rug to prevent shrinkage thereof. In addition, the invention provides a rug scouring machine as set forth which utilizes a single conveyor and at the same time provides for scrubbing of both sides of the rug by mechanical means.

While particular embodiments of the method and apparatus of the present invention have been set forth herein, it is not intended to limit the invention to such disclosures, and changes and modifications may be made and incorporated therein as desired within the scope of the following claims.

We claim:

1. In rug scouring apparatus, a roll mounted to rotate about a horizontal axis, means to feed a rug to said roll to travel therewith about the surface of the roll with one side of the rug facing outwardly, means to support the rug continuously at said one side thereof for substantially the entire portion of its travel with the roll, an endless conveyor having outwardly projecting pins normally perpendicular to the path of the conveyor arranged at intervals longitudinally and transversely thereof and disposed to pass closely adjacent said rug support means and the roll to cause the latter to impale the rug upon the pins of the conveyor with the other side of the rug facing outwardly thereon, and means mounting said conveyor positioned with respect to the roll to cause the latter to angularly deflect the conveyor inwardly of its normal path in the zone of rug impalement and thereby dispose successively adjacent pins in angularly convergent relation outwardly of the conveyor with their points more closely spaced as the rug is impaled thereon so that when the conveyor again straightens out the normally perpendicular pins will hold the rug against buckling in the direction of its travel and oppose shrinking thereof.

2. In rug scouring apparatus, a roll mounted to rotate about a horizontal axis, means to feed a rug to said roll to travel therewith about the surface of the roll with one side of the rug facing outwardly, an endless conveyor having outwardly projecting pins normally perpendicular to the path of the conveyor arranged at intervals longitudinally and transversely thereof and disposed to pass closely adjacent said roll to cause the latter to impale the rug upon the pins of the conveyor with the other side of the rug facing outwardly thereon, and means mounting said conveyor positioned with respect to the roll to cause the latter to angularly deflect the conveyor inwardly of its normal path in the zone of rug impalement and thereby dispose successively adjacent pins in angularly convergent relation outwardly of the conveyor with their points more closely spaced as the rug is impaled thereon so that when the conveyor again straightens out the normally perpendicular pins will hold the rug against buckling in the direction of its travel and oppose shrinking thereof.

3. In rug scouring apparatus, a roll mounted to rotate about a horizontal axis, means to feed a rug to said roll to travel therewith about the surface of the roll with one side of the rug facing outwardly, an endless conveyor having outwardly projecting pins normally perpendicular to the path of the conveyor arranged at intervals longitudinally and transversely thereof and disposed to pass closely adjacent said roll to cause the latter to impale the rug upon the pins of the conveyor with the other side of the rug facing outwardly thereon, means mounting said conveyor positioned with respect to the roll to cause the latter to angularly deflect the conveyor inwardly of its normal path in the zone of rug impalement and thereby dispose successively adjacent pins in angularly convergent relation outwardly of the conveyor with their points more closely spaced as the rug is impaled thereon so that when the conveyor again straightens out the normally perpendicular pins will hold the rug against buckling in the direction of its travel and oppose shrinking thereof, and means to support the rug continuously during its travel with the roll from said feed means to the endless conveyor.

4. In rug scouring apparatus, a roll mounted to rotate about a horizontal axis, means to feed a rug to said roll to travel therewith about the surface of the roll with one side of the rug facing outwardly, an endless conveyor having outwardly projecting pins normally perpendicular to the path of the conveyor arranged at intervals longitudinally and transversely thereof and disposed to pass closely adjacent said roll to cause the latter to impale the rug upon the pins of the conveyor with the other side of the rug facing outwardly thereon, means mounting said conveyor positioned with respect to the roll to cause the latter to angularly deflect the conveyor inwardly of its normal path in the zone of rug impalement and thereby dispose successively adjacent pins in angularly convergent relation outwardly of the conveyor with their points more closely spaced as the rug is impaled thereon so that when the conveyor again straightens out the normally perpendicular pins will hold the rug against buckling in the direction of its travel and oppose shrinking thereof, means to support the rug continuously during its travel with the roll from said feed means to the endless conveyor comprising tensioned wire elements extending circumferentially of the roll to engage the outer side of the rug in an initial portion of its travel with said roll, and a plurality of supporting members disposed to engage said outer side of the rug in the succeeding portion of its travel with the roll.

5. In rug scouring apparatus, a roll mounted to rotate about a horizontal axis, means to feed a rug to said roll to travel therewith about the surface of the roll with one side of the rug facing outwardly, a conveyor comprising an endless series of articulated plate elements extending transversely of the direction of travel of the conveyor and each having thereon a plurality of outwardly projecting pins arranged in spaced alignment transversely of the conveyor and disposed normally perpendicular to the path of the conveyor to pass closely adjacent said roll and cause the latter to impale the rug upon the pins of the conveyor with the other side of the rug facing outwardly thereon, and means mounting said conveyor positioned with respect to the roll to cause the latter to angularly deflect successively adjacent plates with respect to each other inwardly of the normal path of travel of the conveyor in the zone of rug impalement and thereby dispose the pins on successively adjacent plates in angularly convergent relation with respect to one another in a direction outwardly of the conveyor with their points more closely spaced as the rug is impaled thereon so that when the conveyor again straightens out the normally perpendicular pins will hold the rug against buckling in the direction of its travel and oppose shrinking thereof.

JACK P. WILSON.
WILLIAM H. SCOTT.

References Cited in the file of this patent

UNITED STATES PATENTS

| Number | Name | Date |
| --- | --- | --- |
| 44,820 | Price | Oct. 25, 1864 |
| 821,764 | Strasshoefer | May 29, 1906 |
| 854,478 | Ford | May 21, 1907 |
| 872,823 | Ketzler | Dec. 3, 1907 |
| 991,411 | Anderson | May 2, 1911 |
| 1,217,129 | Regout | Feb. 20, 1917 |
| 1,402,020 | Smith et al. | Jan. 3, 1922 |
| 1,460,883 | Bougher | July 3, 1923 |
| 1,494,895 | Foldessy | May 20, 1924 |
| 1,564,226 | Finnell | Dec. 8, 1925 |
| 1,564,453 | Shampay | Dec. 8, 1925 |
| 1,588,342 | Stevens | June 8, 1926 |
| 1,654,635 | Brantley | Jan. 3, 1928 |
| 1,654,676 | Brantley | Jan. 3, 1928 |
| 1,738,541 | Shampay | Dec. 10, 1929 |
| 1,786,031 | Scott | Dec. 23, 1930 |
| 1,861,476 | Khanzadian | June 7, 1932 |
| 1,896,588 | Laurie | Feb. 7, 1933 |
| 1,962,879 | Schmidt | June 12, 1934 |
| 2,067,752 | Chase | Jan. 12, 1937 |
| 2,234,813 | Tomaino | Mar. 11, 1941 |
| 2,278,820 | Anderson | Apr. 7, 1942 |
| 2,466,348 | Ambye | Apr. 5, 1949 |
| 2,576,633 | Naylor | Nov. 27, 1951 |

FOREIGN PATENTS

| Number | Country | Date |
| --- | --- | --- |
| 335,861 | Great Britain | Oct. 2, 1930 |
| 515,989 | Germany | Jan. 16, 1931 |
| 936,770 | France | July 29, 1948 |